United States Patent Office 3,223,356
Patented Dec. 14, 1965

3,223,356
DEFLECTED SLIPSTREAM SYSTEM
FOR AIRCRAFT
Alberto Alvarez-Calderón, 1560 Castilleja St.,
Palo Alto, Calif.
Filed Mar. 6, 1963, Ser. No. 263,217
11 Claims. (Cl. 244—13)

This invention relates to aircraft. Specifically, it refers to deflected slipstream V/STOL propeller planes and constant angle of attack aircraft.

As proposed in the past, the deflected slipstream high lift method consists of a flapped wing which for VTOL and STOL, deflects downward the propeller slipstream to augment lift and provide vertical flight. In cruising flight, the flap is retracted to a conventional position conforming to the basic airfoil contour, and the slipstream is not deflected by the flap. These principles are well known, see for instance the aircraft of NASA TN–D89.

The limitations of VTOL deflected slipstream methods are known to be specially serious in presence of ground effect: the turning angle of propeller thrust vector with the best flaps in actual practice has been found to be about 55 degrees, requiring a hovering attitude of about 35 degrees if the wing chord is set at the usual small incidence in the fuselage. Usually the wing is set at about 15 degrees incidence which results in a hovering attitude of about 20 degrees, but the aircraft cruises then with the fuselage at minus 15 degrees which is undesirable. In any case, the change of aircraft attitude from hover to cruise is about 35 degrees. Obviously, this is an excessive change of angle for visibility, for passenger comfort, and for drag and landing gear size.

Additionally, however, there is a serious loss of lifting thrust in the process of turning the propeller slipstream, which loss appears at large flap deflections near the ground, and certain problems on pitch stability in hover and transition.

Boundary layer control is known to improve flow conditins in and out of ground effect; however, in ground effect the improvements are not as large as desired.

It is known that for vertical flight because of the above problem, the deflected slipstream system has been practically abandoned after the disappointing results found in full size tests of aircraft, such as those for the aircraft reported in NASA TN–D89. All efforts are presently directed to the tilt wing system as the most promising of the propeller VTOL systems.

I have investigated the deflected slipstream concept and problems and have invented a new configuration for the propellers, flaps, and wings to vastly improve the airplane's aerodynamics.

Briefly, I use unique and unusual flaps and flap settings to deflect the slipstream in an upward direction from the wing in cruising flight, and in a downward direction from the wing for STOL and VTOL flight; consequently in my new configuration there is a greatly decreased change of attitude from hover to cruise, and the aircraft can operate with a large incidence in wing and thrust, hover with smaller downward flap deflections while allowing good turning efficiency even in ground effect, and cruise with excellent propulsive efficiency.

By virtue of my invention the deflected slipstream is made directly competitive with the tilt-wing and other V/STOL systems, while retaining the advantages of a fixed wing.

It is one object of my invention to diminish the change of aircraft attitude between hover and cruise of a deflected slipstream VTOL and STOL aircraft.

Another object is to improve the turning efficiencies of such aircraft by proper incidence settings of wings, thrust and flaps.

One more object is to improve the effective turning angle of such aircraft by proper configuration choice of the wing system.

One more object of my invention is to decrease the flap deflection required for V/STOL flight. Yet another object of my invention is to operate in V/STOL flight with the flaps neutral and reduced pitching moments.

Yet another object of my invention is to provide a flap system for aircraft which permits large variations of lift without change of wing angle of attack or incidence, and which therefore permits constant attitude take off, cruise and landing.

This and other objects of the invention are evident by an inspection of the figures of the invention in which.

Figure 1:
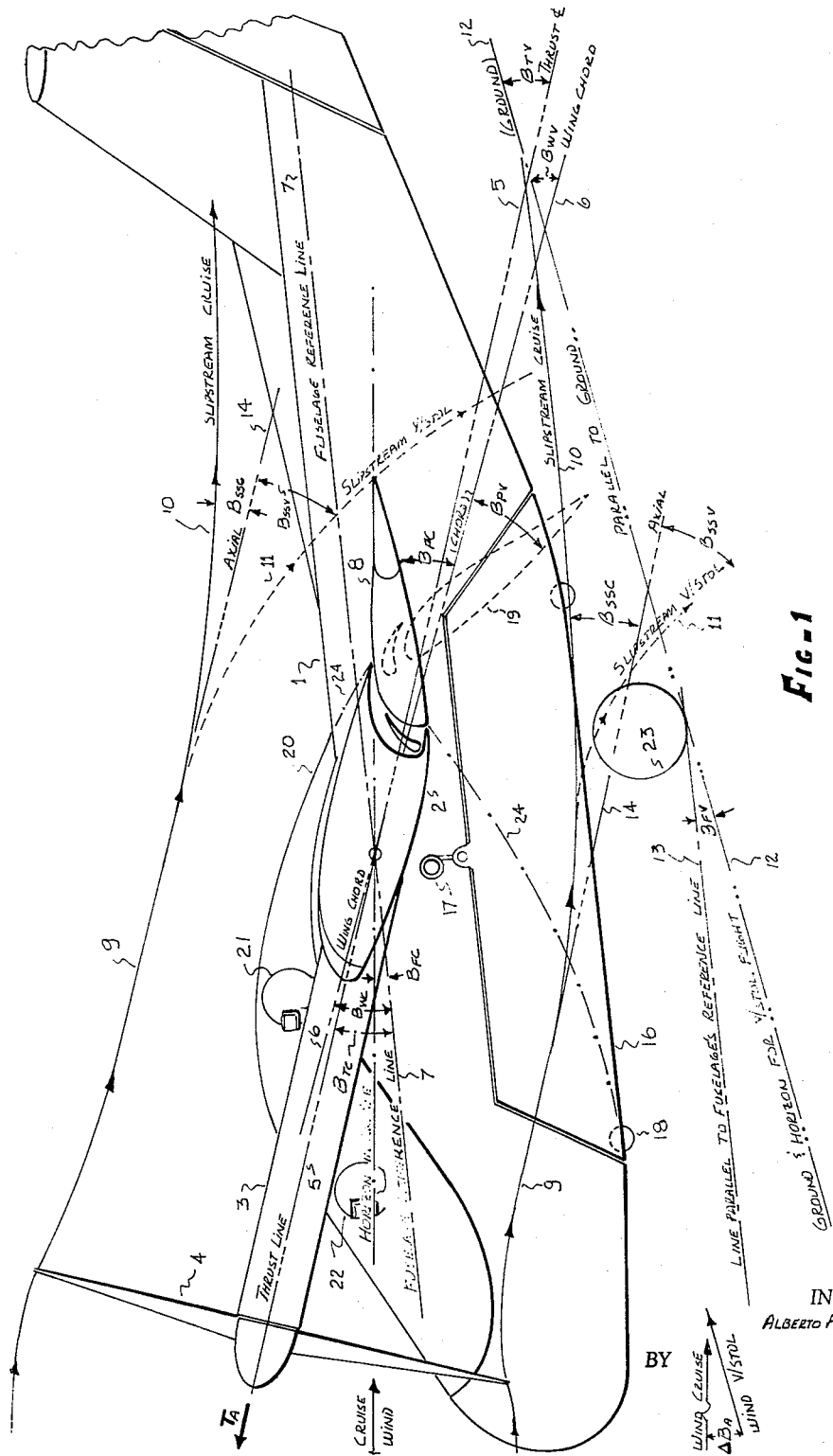
FIG. 1 shows a side variation of a V/STOL aircraft incorporating my superior flap-wing-propeller configuration and showing the upward and downward slipstream deflection for cruise and V/STOL flight, respectively.

With initial reference to FIG. 1, I show in side elevation a fuselage 1 supporting a wing 2. The wing supports engines 3 with propellers 4, and flap 8. I will now explain and describe my invention of my reversed slipstream deflection in cruise. Prior to this explanation however, I will review the state of the art: In the past aerodynamists working on winged V/STOL aircraft, have selected a basic airfoil on the basis of the airfoil's characteristics. For high lift work, there have been selected basic airfoils like the NACA 4415 or the NACA 23018. These basic airfoils are used for cruising flight, and the flaps used for high lift are retracted for cruise to conform to the basic airfoil. Thus, in cruise, the flaps and/or slipstream are not deflected downward; the flap is fully retracted. For V/STOL flight the flap and slipstream are deflected to increase lift.

The resulting aerodynamics are exemplified in two well known V/STOL deflected slipstream prototype aircraft: The Ryan VZ3RY and the Fairchild VZ5FA, both of which are now practically abandoned.

In the former (from NASA TN–D89) the wing is set at an incidence of 22 degrees with respect to the fuselage reference line to improve the hovering angle of attack or attitude. As a result, the aircraft cruises with the fuselage at about minus 22 degrees attitude. The incidence of the thrust line is 13 degrees, as a result the thrust line in cruise flaps up has about a minus 9 degrees angle of attack, introducing a negative lift or downforce when propelling the engine. The aircraft hovers in ground effect with the thrust axis at 35 degrees. The total change of attitude is then about 44 degrees from in ground hover to cruise flight. This is just too much for practical flight.

A similar aerodynamic behavior is displayed by the Fairchild VZ5FA. In that aircraft, the wing and thrust line are mounted at about zero incidence; the aircraft hovers on ground at about plus 40 degrees attitude and therefore the rear of the fuselage is swept upward to clear the ground in hover. This adds drag in cruise; the hover attitude is impractical.

Both of these aircraft have been designed by evolutionary thinking which adapts conventional airfoils to unusual demands and obtain unsatisfactory results.

In my aircraft of FIG. 1 I show a revolutionary airfoil which vastly improves and fully satisfies the aerodynamics of deflected slipstream V/STOL aircraft even in presence of the ground. The new solution is as ingenious as it is structurally simple. Instead of using no slipstream deflection in cruise by the flap, and large inefficient slipstream deflection in V/STOL flight, where efficiency is required, I use an upward slipstream and flap deflection in cruise of small magnitude and excellent aerodynamic efficiency; in V/STOL flight I use a relatively small downward slipstream and flap deflection for aerodynamic efficiency in that condition also. This permits to set the thrust line and wing incidence at a large angle in the fuselage while retaining good propulsive efficiency in cruise and greatly decreased change of attitude from hover to cruise.

Before going into the details of the aerodynamics of FIG. 1, I want to note certain distinctions between the airfoil in FIG. 1 and other work. Reversal in the camber of airfoils has been the subject of investigation by aerodynamists before. Reflexed airfoils which are unflapped have been proposed for flying wings because of their stable pitching moment characteristics. (See "Principles of Aerodynamics" by Dwinell, Chapter 5.) Reversible camber flaps (not airfoils) for hover and transition of V/STOL flight have been proposed to improve the pitching moment characteristics of deflected slipstream V/STOL aircraft.

What I have invented now however, is a new airfoil having flaps to reverse the camber, which flaps have a fixed flap position negatively inclined to the main wing portion which is permanently fixed at a negative angle in cruising flight. This system, in combination with a unique application of the deflected slipstream system for cruise, renders vastly improved aerodynamic cooperation and advantages to V/STOL propeller aircraft, which are indicated in the embodiment of FIG. 1. It should be understood however, that the quantitative values of the description are introduced not as a limit to the drawing, but in the specifications and by way of example and not of limitation. The angles and lines of the drawings are shown in symbolic form to be useful for individual design purpose. The values shown, however, are representative of actual design.

Let the fuselage have a reference line 7 useful to determine the attitude of the aircraft with respect to a horizontal reference during the various flight conditions.

I choose this line to cruise at a slight negative angle $B_{FC}$ of about $-6°$ with respect to the horizon. (F for fuselage, C for cruise, B hereafter denotes any angle.) I set the wing incidence at a large angle $B_{WC}$ of about $+21$ degrees with respect to the reference line for cruise (W for wing). Now such an incidence angle would stall a normal airfoil since the approximate angle of attack $B_{WC}+B_{FC}$ is $21+(-6)=15$ degrees. This large incidence is desirable only for V/STOL flight, as will be shown later; however, to avoid stall in cruise, instead of decreasing the wing angle of attack (say by a negative cruise attitude) I reverse the camber of the wing with my large flap 8 deflected at a fixed negative large cruise flap angle $B_{PC}$ of $-25$ degrees. This decreases the wing lift coefficient in cruise to about 0.3 and therefore the effective aerodynamic angle of attack of the wing to about 4 degrees, even though the geometric angle of attack of the fixed wing portion remains about 15°. This variation of effective angle of attack will be explained in detail in connection to FIG. 2, but it may be understood by those skilled in the art.

Proceeding with the configuration of FIG. 1, instead of fixing the thrust line 5 at a large negative angle of attack to the wind in cruise (as in the VZ3RY), I set my thrust lines at a large positive incidence $B_{TC}$ (T for thrust) of about 18 degrees and a large positive angle of attack $B_{TC}+B_{FC}$ of about $18+(-6)=12$ degrees. There is a twofold advantage in this: the turning of the propeller vector is decreased for hover and the propeller is moved upward away from the ground for hover. Now, if the slipstream in cruise were to leave the aircraft at a 12° angle in the axial direction, there would be a loss of thrust for cruise propulsion which would not be tolerable. I have however, placed the wing and flap 8, as shown, to re-direct the slipstream by an angle $B_{SSC}$ (SS for slipstream) from an axial direction 14 to a cruise direction 10 which is approximately horizontal, thereby restoring completely the cruise propulsive efficiency. (This statement follows from Newton's II Law.)

I have thus far explained the peculiar aerodynamics of my configuration in cruise. Now I refer to the dash-dash lines showing the flap and slipstream in deflected position 19 and 11 respectively for V/STOL flight. Flap is deflected by angle $B_{PV}$ (P for flap, V for V/STOL) and slipstream by angle $B_{SSV}$. (SS for slipstream.)

For the particular case of hovering flight, I show the ground or horizon reference and the consequent aerodynamics. Let the fuselage reference line be inclined at angle $B_{FV}$ of $+10$ degrees only. Then the total change of attitude $B_A$ from hover to cruise is $$B_{FV}-B_{FC}=10-(-6)=+16$$

degrees, (which compares to about 40 degrees with the usual deflected slipstream configuration). This value of $B_{FV}$, small at 10 degrees, still allows greater angle of attack for backward flight. The consequent aerodynamics in hover are shown by aid of line 13 (parallel to fuselage reference line 7) inclined at angle $B_{FV}$ to horizon 12 for hover. What is the thrust line condition in hover? The projection of horizon 12 and thrust line 5 shows an intersection at angle $B_{TV}$ (T for thrust, V for V/STOL) where $B_{TV}=B_{TC}+B_{FC}=18+10=28$ degrees. This occurs without taking into account flap deflection for slipstream turning, i.e., the axial propeller thrust $T_A$ has a lifting component $T_A \sin 28°=0.47\ T_A$ at a fuselage attitude of only 10 degrees and at zero flap deflection. In this condition with the flaps neutral, i.e., below the cruise position and parallel to the plane of the wing, the aircraft feels as a "tilt wing" machine with a wing and propellers tilted by 28 degrees! This is a condition of interest also in that there are no pitching moments due to flap deflection. I note then that pitch stability is extremely simple for this case.

Now, for hover, all that the flap has to do is deflect the slipstream (and flap) downwards by $(90-28)$ degrees$=62$ degrees, which falls within the values obtainable with flaps without Boundary Layer control in ground effect. Such a turning angle with Boundary Layer Control in ground effect can be easily obtained with hovering efficiencies of nearly 100%.

I have thus shown that my reversed deflected slipstream system produces a decreased total change of attitude from hover to cruise; this together with the proper thrust incidence results in a great direct contribution to lift from axial thrust without counting slipstream downward deflection contributions due to flap and without sacrifice to cruise propulsive efficiency; finally, the cruise and hover attitude is excellent for comfort and visibility, and the hover attitude permits large tail clearance, backward flight possibility, and a reduced size of landing gear. The propeller configuration is high and removed from the ground to avoid propeller ground effect.

Some additional comments are of importance in the aircraft of FIG. 1. The fuselage joint to the top of the fixed wing is such that it permits smooth flow on top of the fuselage up to the flap as shown, and it also permits crossflows in a spanwise dimension across the the fuselage for the case of toed-in propellers mounted at the wing's root as shown in FIG. 1. This is of great importance to minimize unsymmetric roll due to single propeller operation. It can be seen in the figure that fuselage top portion 20 above the wing blends smoothly to the position of the deflected flap 8, and the slipstream can flow smoothly by the rear of the fuselage to flow down the flaps but yet can flow spanwise across the fuselage specially in top of the wing itself.

The pilots 21 and 22 are mounted on the aircraft such that the visibility of the combined pilots has no blind spots produced by the plane of the wing or the nacelles. Note that one pilot is above the wing and nacelles and the other below. The upper one has rear visibility.

Finally, there is provided a payload container 16 which is pulled tight to the aircraft by winch 17 and which if released can be conveniently rolled below the aircraft on little wheels 18 in a path between the aircraft's main gear 23. This container can carry a stretcher, bombs, food, liquor, and other fuels, and such items as are useful for the destruction and/or conservation of humans at peace and in war. The container can be also adapted as a flotation gear or even substituted by a hull.

As a special arrangement, in FIG. 1 there is shown a special fuselage high lift shape indicated by line 24 which determines the junction of the rear of the fuselage to the wing's trailing edge portion. The fuselage's upper surface adjacent to the wing is approximately level with it; the propeller's thrust line 5 of each propeller is toed out and its axial direction passes adjacent to the center of gravity of the aircraft. Thus for single engine operation, the propeller slipstream actually crosses over the fuselage due to the toe-out angle and reduces the rolling moments due to slipstream in single engine operation by a vast amount. Such a high lift fuselage configuration is extremely useful combined with a tail configuration like the P-38 Lockheed fighter of World War II vintage.

I will now discuss specific airfoils which I have designed for various applications for V/STOL and other aircraft.

Figure 2:
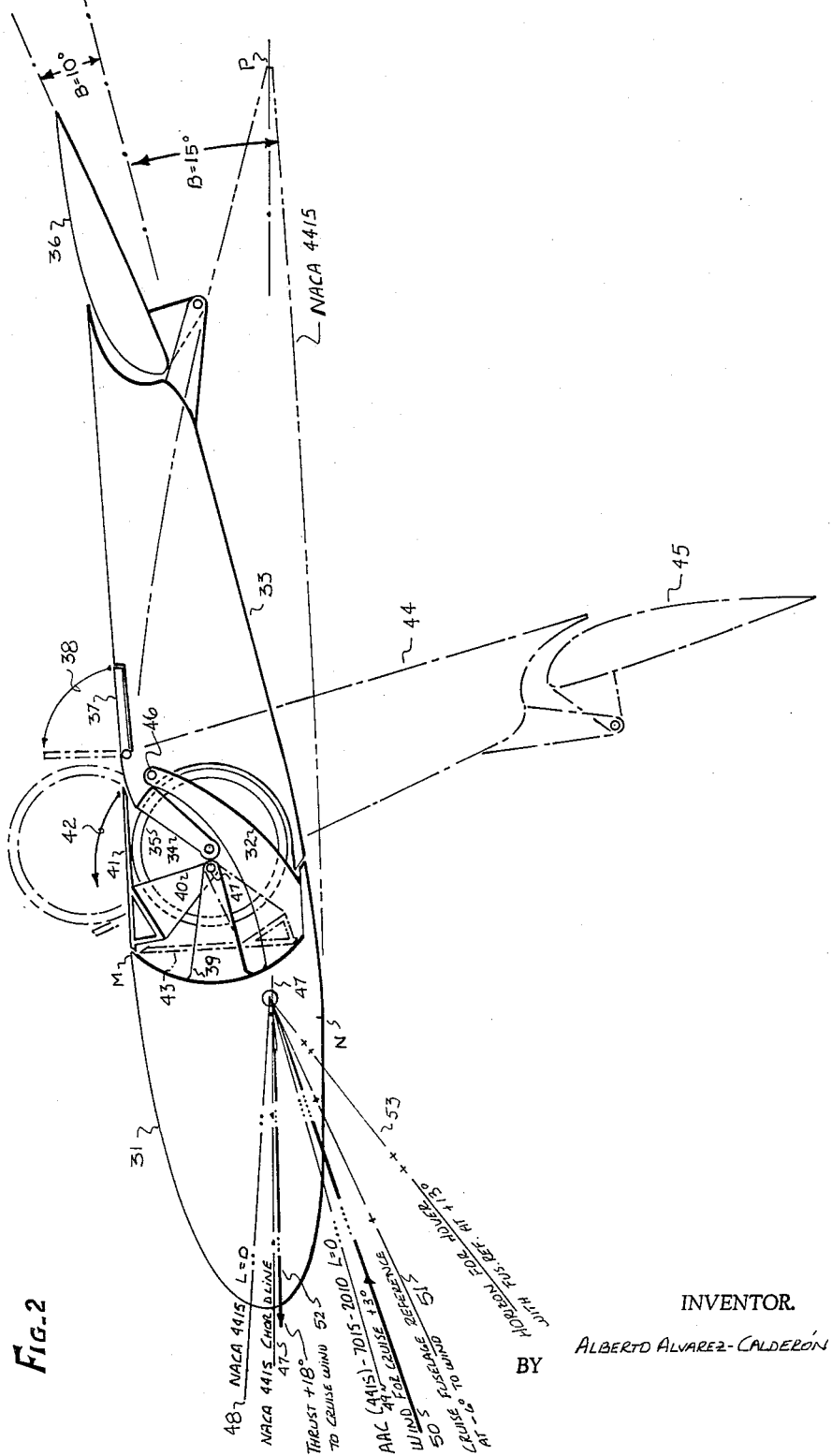
FIG. 2 shows in side elevation and in detail new flapped V/STOL wing section incorporating a Boundary Layer control device.

FIG. 2 shows a highly sophisticated airfoil useful for deflected slipstream V/STOL aircraft using Boundary Layer control. BLC is shown by means of a large aerodynamically balanced Rotating Cylinder Flap. Specifically, the figure shows a primary wing portion 31 which has a flap bracket 32 supporting a main flap 33. Flap 33 supports auxiliary flap 36, rotating cylinder 35 by means of cylinder bracket 34, and flap (not wing) spoiler 37 which serves to provide roll control for the deflected flap position by relative angular motion 38. Before entering into the aerodynamics of the system, I conclude the kinematics: Flap 33 can be deflected by about 70 degrees to position 44 about flap pivotal axis 46; this motion requires the cylinder to emerge above the wing. Consequently, I have provided a unique and simple cylinder cover plate supported by the wing itself: wing bracket 39 supports pivotally a cover plate bracket 40 at or between spanwise ends of cylinder segments. Bracket 40 supports cylinder cover plate 41 which is shown covering the cylinder for cruise and providing a low drag surface between the wing's and flap's upper surface for cruise; for V/STOL, cover plate is moved angularly along arc 42 about axis 47 to final position 43 in which the cylinder can emerge upward with flap deflection. This simple door cover plate is considered an exemplary and practical solution for a cylinder cover plate in that it avoids door sliding, it can be placed completely inside the wing when retracted, it is simple, stiff, and of low drag, and it can also act as a wing (not flap) spoiler for intermediate door position. For deflected main flap position 44, auxiliary flap can take position 45 opening a slot and increasing flap camber.

I now refer to the aerodynamics of my wing and flap of FIG. 2. My wing section I derive from the well known NACA 4415 airfoil, noting however, that only portion 31 of my wing has that shape from point M round the leading edge to point N.

The rest of my airfoil differs completely from the NACA 4415. This is shown by comparing the NACA 4415 airfoil shown as line dash-dash line airfoil with a trailing edge P, to my airfoil shown in solid lines with negative flap settings for cruise 33 for the main flap of —15 degrees, and 36 for the auxiliary flap by an additional —10 degrees.

I now calculate the aerodynamic characteristics of my airfoil referred to chordline 47 of the NACA 4415 as a geometric reference of convenience, and thereafter to the line of zero lift. This line is a line having the direction of wind relative to the airfoil for zero lift. This line for the NACA 4415 is shown as 48 at +4 degrees to the airfoil's chordline. It was obtained from wind tunnel data from NACA TR 824.

I calculate the change of angle of zero lift of my wing section of FIG. 2 due to my flap deflection. This I do by means of flap theory rather than camber theory as the former is a more practical method for this case. Using equation (7.17) and Table XIV of "Applied Wing Theory" by E. Reid, we have $$\Delta_{LO} = KB$$

where $\Delta_{LO}$ is change of angle of zero lift caused by a displacement B of the flap, and K is a factor depending on the ratio of the flap chord to wing chord.

I use superposition to calculate the effect of the main flap and the auxiliary flap. From FIG. 2, the main flap has a chord of 70% of the wing chord, and $K=0.923$; for the small flap having an effective chord of 20% of the wing chord, $K=0.55$. Because the change of camber increases the upward or reverse curvature on the pressure (bottom) surface of the wing at positive lift coefficients, no flow deterioration is occurring and the values of Table XIV for K are appreciable in full.

I therefore have, for the main flap $$\Delta_{LO} = -0.923(15°) = -13.9°$$

and for the small flap $$\Delta_{LO} = -0.550(10°) = -5.5°$$

The total change of angle of zero lift is $-19.4°$. This I mark as line of zero lift 49 for my airfoil referred to as an AAC family.

I now calculate the angle of attack $\alpha$ for lift coefficient of cruise condition at $C_1 = 0.30$ measured from zero lift line: from elementary considerations $$\alpha = 0.30 \frac{1}{0.10} = 3°$$

where 0.10 is slope of lift curve for 15% thick five digit airfoil. This determines the relative wind velocity vector for cruise shown as 50. Note that induced angle of attack is neglected as this depends on a specified aspect ratio. In any case, this induced angle is small because the lift coefficient in cruise is small, and can be neglected for this purpose.

I now choose that the fuselage reference line is to cruise at minus 6° of attitude to the horizon. Hence that line, shown as 51, will have 6° negative incidence to the cruise wind line. Note the cruise wind line is a horizontal line in cruise.

I now choose a thrust line that will cruise at plus 18 degrees with respect to cruise wind line. This I show as 52.

I now calculate the advantages of my various choices for the hovering case. Let the fuselage reference line have a +13 degrees attitude in hover as shown by line 53. I ask what is the angle $B_{TV}$ (see also FIG. 1) between the thrust line 52 and ground 53 in hover? $B_{TV}$=angle from ground to fuselage reference plus angle from fuselage reference to thrust line=$13°+24°=37°$. The lifting component of the axial thrust in hover is $T_A \sin 37°$ or $0.60\ T_A$ even without taking into account additional lift due to flap deflection. The angle through which the thrust vector has to be turned by the flap is now only $90°-37°=53°$. Now this turning angle can be easily obtained with 100% efficiency with a Rotating Cylinder Flap in ground effect. This configuration of FIG. 2 is really extraordinary in that it requires a small turning angle, it has a small total change of attitude from hover to cruise of only 19 degrees, and it hovers at +13 degrees of attitude only.

For STOL, of course, the configuration can operate extraordinarily well. For example, with neutral flaps more than half of the propeller thrust appears as direct lift with zero pitching moments due to flap.

I now demonstrate an application of my reversible camber flaps for cruising flight to STOL aircraft without slipstream and for conventional aircraft.

It is known that variation of fuselage angle of attack is undesirable for landing and take off in that the size of the landing gear has to be longer and the rear part of the fuselage inclined upwards to clear the tail in landing. Additionally, large variations of fuselage attitude are difficult for the pilot to estimate and render difficult consistent approaches. Finally, on certain aircraft large variations of angles of attack are not possible due to long fuselage, and a variable incidence wing is then required for landing as for example in the Chance Vought "Crusader." Previous attempts to obtain satisfactory variations of lift without change of angle of attack have failed, even with Boundary Layer Control.

In my invention the new flap system has movable portions including inboard and outboard regions which are deflected at a fixed negative flap setting for cruise. This permits a large incidence to be fixed between the wing and fuselage. Hence when the flaps are deflected downwards, there is a large effective angle of attack present on the wing without change of fuselage attitude.

Figure 3:
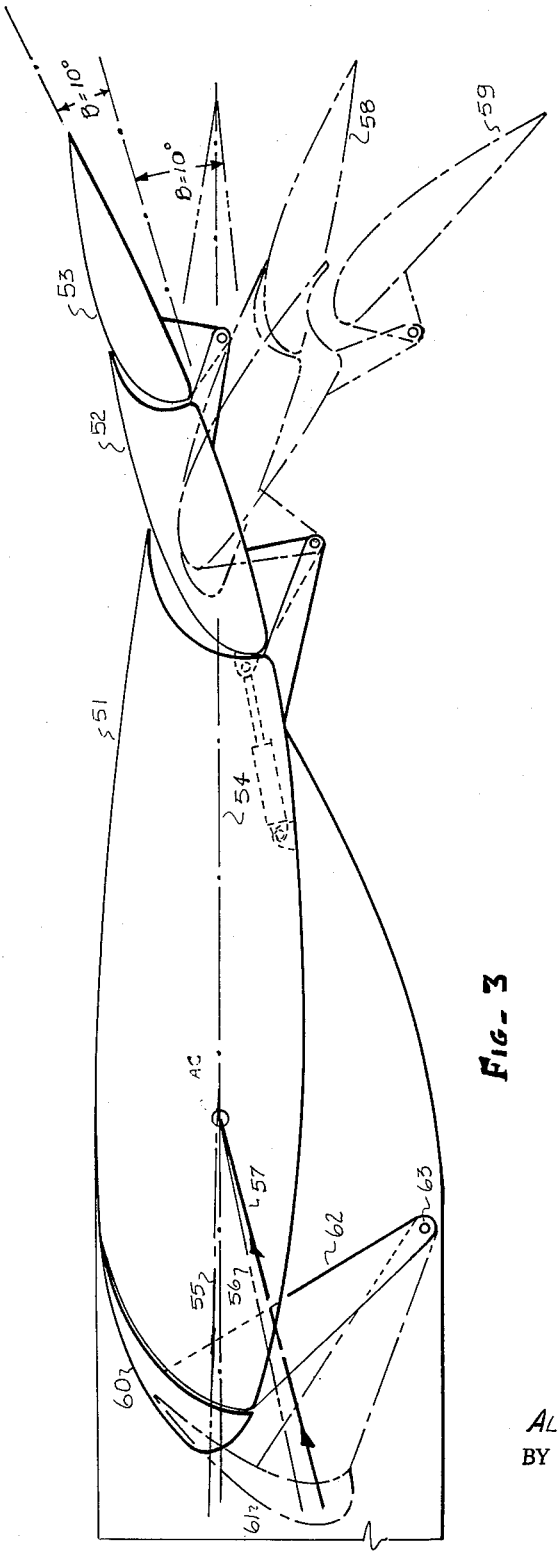
FIG. 3 shows in side elevation an alternate arrangement of my reversed camber flap for conventional aircraft in order to virtually eliminate change of attitude for take off, cruise and landing.

This is exemplified and clarified with the aid of FIG. 3. FIG. 3 shows a NACA 23015 airfoil 51 modified with a 40% chord double slotted flap having a forward portion 52 inclined upwards by 10 degrees and a rear portion also inclined upwards by an additional 10 degrees. The chord line is 54. The basic characteristics of the modified wing section are calculated by the same method and references of FIG. 2. I have, in FIG. 3:

Basic airfoil NACA 23015;

Angle of zero lift $-1°$ to chord shown as 55.

Change of angle of zero lift due to forward flap upward deflection of 10 degrees $= -0.748(10°) = -7.5°$;

Change of angle of zero lift due to rear flap upward deflection of 10 degrees $= -0.55(10°) = -5.5°$;

Total change of angle of zero lift $= 13.0°$; this is shown as line 56. Setting the crusing wind direction of a lift coefficient of 0.3 we establish a wind vector 57, 3 degrees below the zero lift line. Line 57 is made coincident with the fuselage reference line.

We ask what is the lift coefficient of the same wing at the same fuselage attitude but with the flap moved downward to say a neutral position as for conventional small aircraft take off: from NACA TR 824 we get a lift coefficient of 1.4 disregarding induced angle effects at an angle of attack of 15 degrees.

Now the maximum section lift coefficient of the NACA 23012 (recalling that the flap is undeflected) is about 1.6. Thus the take off maneuver can be made without changing fuselage attitude or wing angle of attack from cruise attitude at a lift coefficient as large as prudently available, namely 1.4. Now for STOL take off the flap can be deflected to position 58 at the same fuselage incidence and wing angle of attack, and for landing to position 59 for the same fuselage incidence and wing angle of attack. That the fuselage incidence and wing angle of attack of 15 degrees to the chordline can fully use landing lift follows from the well known fact that a flapped wing can seldom exceed 15 degrees angle of attack with the flap deflected about 40 degrees without stalling. I have therefore shown that by my reversible camber flaps for cruise, like in FIG. 3, a wing can cruise, take off and land most efficiently at the same wing and fuselage incidence and angle of attack. This permits a shorter landing gear, greater passenger comfort and safety, easier learning process for new pilots and safety, good visibility, low fuselage drag, and great accuracy of approach due to no need of large attitude variations.

I mentioned that the wing with the flaps deflected approached the stalling angle at the same attitude. It follows that for STOL, or for say BLC applications, a leading edge high lift device may be useful. I show an automatic Handly Page slat which is drawn out by suction at the leading edge at high lifts from retracted position 60 to 61. However, instead of mounting the slat at the wing by means of tracks or 4-arm links, I mount my slat by a single pivotal arm 62 supported at axis 63 preferably at a chordwise aircraft body component which is not the wing but a body such as the fuselage, an engine nacelle, or a chordwise wing fence or tip plate. The advantage is of course, the great simplicity of my mechanism. As can be seen by inspection in FIGURE 3, the slat in the extended position, together with the leading edge of the wing, defines a converging high lift slot; this is made possible in my design with a fixed bracket by having the pivot axis 63 located below chordal plane 51 at a perpendicular distance approximately equal to the length of the chord between the rounded leading edge and the trailing edges of slat 61, and to the rear of the wing's leading edge, as shown. With this location of the pivot axis 63 and with the upper surface of the wing which is below position 60 of slat being located with respect to axis 63 at a distance no greater than the distance from the trailing edge of slat in position 60 to axis 63, as is evident by inspection of the figure, then the converging slot between slat in extended position 61 and the leading edge of wing 51 which is shown in the figure is defined. Yet the simplicity of a fixed hinge axis and bracket is retained.

I have shown a new family of airfoils which have flaps with negative flap settings for cruise. I have shown their excellent application for V/STOL aircraft and for STOL and conventional aircraft.

I now devise a system to designate the airfoils. For convenience, it is better to modify existing airfoils as this completely avoids the necessity of a new test to determine the airfoil's characteristics. These are obtained from the unmodified airfoil modified by flap theory which is fortunately fully valid for the upward deflections of the flap with the wing at positive lift. To organize the new family of airfoils I identify the family with the letters AAC, followed by the unfodified airfoil's original designation in brackets, followed by groups of 4 digits, with a number of groups equal to the number of flaps. In each group the first two digits designate percent flap chord, and the second two digits designate its negative flap deflection in cruise. It follows then, that FIG. 2 is described as

AAC (NACA 4415) $-7015-2010$ and FIG. 3 is described as

AAC (NACA 23015) $-4010-4010$

FIG. 1 would be approximately

AAC NACA 25118) $-5025-2000$

A conservative application of my reversible camber flaps for cruise to conventional take off aircraft should be shown by the rear flap only of FIG. 3, namely about a 20% chord flap set at about minus 10 degrees. This would be called:

AAC (NACA 23015) $-2010$

Before concluding these specifications, certain additional comments are important with respect to my flaps and wings.

While the description of the figures has referred to trailing edge flaps, it is evident that these flaps can also be used for ailerons, but certain unobvious advantages are: a normal droop aileron is normally neutral in cruise flight and droops to a high lift new "neutral" of about 15 degrees in high lift flight. For my wings, the ailerons have a cruise "neutral" which is negatively inclined at an angle to the wing and can be drooped for high lift flight the usual 15 degrees plus the additional droop equal to the negatively inclined angle of the cruise setting. Thus the increment of wing lift due to aileron droop is increased substantially with my flaps used as droop ailerons.

It is pertinent to note that in the specifications and claims, angles are referred to as positive when they are clockwise in the figure and increase lift, and negative when counterclockwise in the figure and decrease lift.

While the propeller driven structures have been shown optimized for conventional propellers, the geometrical arrangements and aerodynamic advantages are also applicable to shrouded propeller and fan systems. The systems shown in my figure are principally adapted for fixed wing; however, for tilt wing they would also excel to reduce the tilt angle variations.

Various further modifications can be made without departing from the spirit of my invention, and the foregoing are to be considered purely exemplary applications thereof. The actual scope of the invention is to be indicated by reference to the appended claims.

I claim:

1. For an aircraft having a fuselage with a pair of fixed wings, the improvement to minimize the variations of fuselage and wing angle of attack for take off, cruise and landing comprising: movable trailing edge wing portions extending along substantially the entire trailing edge of said wings with said movable portions having an inboard region and outboard region, said inboard region and said outboard region being adapted to be adjusted with a permanent negative upward deflection with respect to said wings during cruise flight, downwards to a take off position below the position with said negative deflection and to a landing position in which at least said inboard regions are moved downwardly to a position below said take off position, said aircraft being further characterized in that said fuselage has a longitudinal reference line; in that each of said wings has a leading edge, a trailing edge portion, an upper surface, a lower surface, and a chordal plane passing through said leading edge and between said upper and lower surfaces; in that said inboard regions have a principal body portion which in an intermediate position is located substantially between the rearward projections of the upper and lower wing surface portions which are adjacent to said trailing edge portion, with the rearward extension of said chordal plane passing through said body portion in said intermediate position; in that said inboard regions in said intermediate position determine a first wind direction relative to said wing and approximately parallel to said chordal plane which produces substantially no wing lift and defines a first angle of zero lift with respect to said chordal plane when said inboard regions are in said intermediate position; in that said inboard regions with said negative deflection determine a second wind direction upwardly inclined towards said chordal plane at which said wing produces substantially no wing lift with said second wind direction defining a second angle of zero lift with respect to said chordal plane; and in that the angle of incidence between said chordal plane of said wing and said fuselage reference line is positive and of a magnitude at least as large as approximately the difference between said first and second angles of zero lift.

2. A propeller driven high lift aircraft having a reduced variation of angle of attack during high speed and slow speed flight conditions comprising a fuselage with a longitudinal line of reference, wings mounted on said fuselage at a substantial positive incidence with respect to said longitudinal line, a pair of propellers mounted ahead of said wings one on each side of said fuselage with said propellers having propeller axes at a large positive incidence with respect to said longitudinal line of reference, a movable trailing edge flap on each of said wings; said aircraft further characterized in that it operates for cruising flight with said line of reference at a small negative angle to the horizon, with said wings and propeller axes during cruise at an intermediate positive angle to the horizon, and with said flaps during cruise flight permanently inclinded upward at a negative angle from said wings to redirect a propeller slipstreams from a propeller axial direction towards a horizontal direction, and in that said aircraft operates during slow speed flight with said line of reference inclined upward to the horizon at an intermediate angle, with said wings and propeller axes inclined upward to the horizon by a large angle, and with said flaps inclined downward to said wings to redirect said propeller slipstream from a propeller axial direction towards a downward direction.

3. The aircraft of claim 2 further including engines enclosed in nacelles mounted on said aircraft for driving said propellers, means in said fuselage for positioning a pair of men, the disposition of said pair of men in said fuselage being such that the head of the first one of said pair of men is located above the level of said nacelles and wings for improved visibility above and to the rear of said aircraft, and the head of the other one of said pair of men is located below said nacelle and wings ahead of said first man for improved visibility below and ahead of said aircraft.

4. The aircraft of claim 2 further characterized in that an upper surface portion of said fuselage terminates upstream of the trailing edge portion of said flap; in that said upper portion is smoothly faired with, and approximately at the same level as, the upper surface of said wing; in that each of said propellers is mounted at a toe-out angle with respect to said fuselage and adjacent to said fuselage; and in that in single engine operation the upper portion of the slipstream of the operative propeller crosses over said fuseleage from the side of said operative engine to the side of the inoperative engine.

5. For an aircraft having a fuselage with a longitudinal reference line, a wing capable of large variations of lift with greatly reduced change of angle of attack and having a wing root portion and a wing tip portion; a trailing edge flap mounted on said wing extending from said root portion to said tip portion; said flap being adapted to be moved from a high speed flight position in which substantially the whole of said trailing edge flap is upwardly inclined with respect to said wing, and to a slow-speed position in which at least a portion of said trailing edge flap is downwardly inclined with respect to said wing, said aircraft being further characterized in that said wing is mounted on said fuselage with a positive incidence angle relative to said reference line of a magnitude appproximately equal to, and of opposite direction, to the angle with which said flap is upwardly inclined with respect to said wing in said high speed flight position.

6. An aircraft capable of large variations of wing lift at approximately constant wing and fuselage angle of attack having: a central elongated fuselage having a longitudinal reference line; a pair of wings mounted one on each side of said fuselage with each of said wings having a primary portion fixed at a large incidence angle on said fuselage, a wing root portion and a wing tip portion; a movable trailing edge flap portion mounted on each of said primary portions extending between said root portions and said tip portions; said flap portions being adapted to be moved with respect to said primary portions to include: a cruise flight position in which substantially the whole of said flaps are upwardly deflected with respect to said primary portions to produce a small lift coefficient on said wings at a large cruise angle of attack of said primary portion approximately equal to said large positive incidence angle; a take-off flight position in which substantially the whole of said flaps are below said cruise flight position to produce an intermediate lift coefficient on said wings at an angle of attack of said primary portion approximately equal to said criuse angle of attack; and a landing flight position in which at least a portion of said flaps are below said take-off position to produce a large lift coefficient on said wings at an angle of attack of said primary portion approximately equal to said cruise angle of attack; said aircraft being further characterized in that said flaps have an intermediate position in which the surface of said flaps are approximately parallel to rearward projection of surface portions of said wings adjacent to said flaps; in that said flaps in said intermediate position determine a first wind direction which produces substantially no wing lift and defines a first angle of zero lift with respect to said wing; in that said flaps in said cruise flight position determine a second wind direction at which said wing produces substantially no wing lift with said second direction defining a second angle of zero lift; and in that the angle of incidence between said wing and said fuselage reference line is positive and at least as large as approximately the differences between said first and second angles of zero lift.

7. An aircraft having a central body portion with a longitudinal reference line; a wing mounted on said aircraft with a positive incidence angle with respect to said longitudinal line; a propeller mounted on said aircraft in advance of said wing to direct a slipstream toward said wing; a movable trailing edge flap mounted on said wing extending in a spanwise direction across said slipstream, said trailing edge flap being adapted to move for changing the lift of said wing and for modulating the direction of said slipstream relative to said longitudinal line, from a slow speed high lift deflected flap position in which said trailing edge flap is downwardly inclined in a camber increasing disposition to direct said slipstream downwards relative to said longitudinal line, to a low drag high speed cruise flight flap position in which said trailing edge flap is permanently upwardly inclined at a negative angle with respect to said wing to redirect said slipstream upwards in a direction approximately parallel to said longitudinal line; said aircraft being further characterized in that the magnitude of said positive incidence angle of said wing with respect to said longitudinal reference line is approximately equal to the magnitude of said negative angle of said flap with respect to said wing.

8. An aircraft capable of developing a substantial portion of lift during slow speed flight by modulating the direction of slipstream and capable of operating with reduced variations of angle of attack with speed comprising a central body portion with a longitudinal reference line; a pair of wings mounted on said aircraft one on each side of said fuselage; a pair of propellers mounted on said aircraft one in advance of each of said wings to direct propeller slipstreams towards said wings, each of said slipstreams having a maximum slipstream width in contact with one of said wings; a movable trailing flap mounted on each of said wings extending in a spanwise direction across said slipstreams with each of said flaps having a span at least as great as approximately said maximum slipstream width; said trailing edge flaps being adapted to move for changing the camber of said wings and modulating the direction of said slipstreams relative to said longitudinal line from a slow speed flap position in which said trailing edge flaps are downwardly inclined in a camber increasing disposition to direct said slipstream downwards relative to said longitudinal line, to a high speed low drag flap position in which said trailing edge flaps are upwardly inclined in a camber reversing disposition to redirect said slipstream upwards in a direction approximately parallel to said longitudinal line; said aircraft being further characterized in that said wing has a positive incidence angle relative to said fuselage reference line of a magnitude approximately equal, to, and in opposite direction, to the angular deflection of said flaps relative to said wing in said high speed position.

9. An aircraft capable of developing an important portion of its lifting forces during slow speed flight from the modulation of the slipstream direction and capable of operating with a reduced variation of fuselages attitude with variations of speed comprising: a central fuselage with a longitudinal reference line; a pair of wings mounted on said aircraft one on each side of said fuselage at a large positive incidence angle with respect to said longitudinal line; a pair of propellers mounted on said aircraft one on each side of said fuselage in advance of said wings each of said propellers having propeller shaft axes upwardly inclined with respect to said line at an angle no greater than approximately said incidence angle and to direct a propeller slipstream rearwardly towards one of said wings; a movable trailing edge flap mounted on each of said wings extending in a spanwise direction across said slipstream; said flaps being movable to modulate the direction of said slipstream between a camber increasing slow speed flight position in which said flaps are downwardly inclined with respect to said wings and the axes of said shafts to redirect said slipstream downwards at a large angle, and a camber reversing high speed cruise flight position in which said flaps are upwardly inclined with respect to said wings at a negative angle with respect to said wings to redirect said slipstream upwardly in an approximately horizontal direction, said aircraft being further characterized in that the magnitude of said positive incidence angle of said wings with respect to said fuselage reference line being of the order of magnitude of said negative angles of said flaps with respect to said wings in said cruise flight position.

10. A wing with a movable trailing edge flap which is adjusted for high speed flight at a fixed flap position in which said flap is upwardly inclined with respect to said wing; a rotating cylinder mounted between said flap and said wing, and a door positioned above said cylinder for pivotal motion of said door about a spanwise axis located below said position of said door between a cylinder-covering door position in which said door extends between the upper surfaces of the flap and wing on top of said cylinder and a cylinder-uncovering position in which said door is pivoted forwardly and downwardly to an open door position approximately perpendicular to said wing.

11. An aircraft wing having a movable trailing edge flap portion, an upper wing surface, a leading edge, a lower wing surface, and a chordal plane intersecting said leading edge and located between said upper and lower wing surface; a supporting element having chordwise surface portions mounted on said wing protruding below said lower surface adjacent to said leading edge; an airfoil shaped leading edge slat having a rounded upstream edge, a trailing edge and a slat chord extending between said leading and trailing edge of said slat, with said slat being movably mounted on said wing by means of a bracket rigidly connected to said slat and pivotally connected to said element at a fixed pivotal axis located to the rear of said leading edge of said wing and below said lower surface of said wing, said bracket being supported by said supporting element at an orientation approximately parallel to said leading edge, with said slat being adapted to be translated on a circular path about said pivotal axis between a downwardly inclined high lift extended slat position ahead of the leading edge portion of said wing wherein the area of said slat increases the area of said wing, to a high speed retracted slat position in which said slat is faired on top of and contiguous to a leading edge portion of said wing when said trailing edge flap is raised above said downwardly inclined position, said slat and wing being further characterized in that: the upper surface portions of said wing which are below said slat in said high speed position are located with respect to said pivotal axis at a distance no greater than the distance between the trailing edge of said slat in said high speed position and said pivotal axis; in that when said slat is in said high lift position the undersurface portions of said slat together with surface portions of said wing adjacent said leading edge define slot walls which are substantially continuously converging from said upstream edge of said slat to said trailing edge of said slat to provide substantially continuously accelerating flows across said slot; and in that the perpendicular distance between said chordal plane and said pivotal axis below said undersurface of said wing is approximately equal to the length of said slat chord.

References Cited by the Examiner

UNITED STATES PATENTS

| | | | |
|---|---|---|---|
| 1,796,860 | 3/1931 | Bowers | 244—10 |
| 1,800,746 | 4/1931 | Page | 244—42 |
| 1,806,379 | 5/1931 | Wood | 244—42 |
| 1,841,164 | 1/1932 | Vestvold | 244—13 |
| 2,167,601 | 7/1939 | Rose | 244—42 |
| 2,402,311 | 6/1946 | Bissett | 244—13 |
| 2,569,983 | 10/1951 | Favre. | |
| 2,650,045 | 8/1953 | Hunt | 244—13 |
| 2,896,881 | 7/1959 | Attinello | 244—42 |
| 3,041,014 | 6/1962 | Gerin | 244—42 |

FOREIGN PATENTS

| | | |
|---|---|---|
| 144,332 | 6/1920 | Great Britain. |
| 431,767 | 1935 | Great Britain. |

MILTON BUCHLER, *Primary Examiner.*

R. DAVID BLAKESLEE, *Examiner.*